United States Patent [19]
Hogarth et al.

[11] Patent Number: 5,597,630
[45] Date of Patent: Jan. 28, 1997

[54] SEAMLESS, TAPERED TUBULAR MEMBER

[76] Inventors: Harold P. Hogarth, 88 Westbrook Dr., O'Fallon, Mo. 63366; Wayne E. Hogarth, 8605 7th St., Downey, Calif. 90241

[21] Appl. No.: 385,798

[22] Filed: Feb. 8, 1995

Related U.S. Application Data

[60] Division of Ser. No. 977,927, Nov. 18, 1992, which is a continuation-in-part of Ser. No. 855,462, Mar. 20, 1992, abandoned, which is a continuation of Ser. No. 712,991, Jun. 10, 1991, abandoned, which is a continuation of Ser. No. 504,079, Apr. 5, 1990, abandoned, which is a continuation of Ser. No. 300,215, Jan. 23, 1989, abandoned, which is a continuation of Ser. No. 46,637, May 7, 1987, abandoned.

[51] Int. Cl.$^6$ .................................................. B29D 22/00
[52] U.S. Cl. ........................ 428/36.1; 428/36.3; 428/36.9; 428/36.91
[58] Field of Search ................................. 428/36.1, 36.3, 428/36.9, 36.91

[56] References Cited

U.S. PATENT DOCUMENTS 3,974,012  8/1976  Hogarth .................................. 156/161

*Primary Examiner*—Christopher W. Raimund
*Attorney, Agent, or Firm*—Lalos & Keegan

[57] ABSTRACT

An elongated, tapered seamless and hollow tubular member of net shape is disclosed. The tubular member is made by a method comprising providing an elongated, tapered mandrel, applying a composite material consisting of reinforced fibers with a resin on the mandrel, providing a shell having an elongated, tapered bore, inserting the mandrel with the composite material applied thereon into the bore of the shell to provide a mold assembly, heating the mold assembly, displacing the mandrel and shell longitudinally toward each other to compress the composite material of the article being formed by simultaneously applying a tensile force at one end of the mandrel and a compressive force at the other, allowing the mold assembly to cool, and then separating the shell and mandrel from the molded article.

11 Claims, 2 Drawing Sheets

SEAMLESS, TAPERED TUBULAR MEMBER

This is a divisional of application Ser. No. 07/977,927 filed Nov. 18, 1992, which is a continuation-in-part of application Ser. No. 07/855,462 filed Mar. 20, 1992, now abandoned, which is a continuation of application Ser. No. 07/712,991 filed Jun. 10, 1991, now abandoned, which is a continuation of application Ser. No. 07/504,079 filed Apr. 5, 1990, now abandoned, which is a continuation of application Ser. No. 07/300,215 filed Jan. 23, 1989, now abandoned, which is a continuation of application Ser. No. 07/046,637 filed May 7, 1987, now abandoned.

This invention relates to an improved molded article and more particularly to an improved molded article formed of a composite material and having an elongated, seamless, tapered and hollow configuration. The invention further contemplates both an improved method of molding such an article as a dimensionally finished part ("net shape") comprised of a composite material and a novel apparatus for practicing such method to produce the product of the present invention.

In the prior art, there has been developed a method of molding an article formed of a composite material and having an elongated, tapered and hollow configuration, which generally consists of providing an elongated, tapered mandrel, applying a composite material consisting of a matrix of reinforcing fibers impregnated with a thermosetting resin, on the mandrel, inserting the mandrel with a composite material applied thereon into an elongated, tapered bore of a sleeve or shell member, and then heating such a mold assembly while applying a compressive force on the end of the mandrel to mold and polymerize the composite material. Such a method and apparatus for practicing such method are disclosed in U.S. Pat. Nos. 2,768,921 to Robert F. Pigg and 3,974,012 to Harold P. Hogarth and is shown in the drawings of this application as "Prior Art" in FIG. 5.

In the methods disclosed in the aforementioned patents, it is contemplated that the mandrel be formed of a metal, the composite material be comprised of a matrix of reinforcing fiber impregnated with a thermosetting resin and the sleeve or shell member be formed of a metal such as aluminum, bronze or certain steels. Spring devices typically are utilized for urging the mandrel into the shell member while heat is applied to polymerize and mold the composite material.

The general molding method and apparatus as described have been found to be satisfactory in producing most molded products. However, they have been found to be entirely unsatisfactory in producing an elongated, seamless, tapered molded article of composite materials with precise dimensions that have not warped in the production process. Moreover, in the production of molded articles from composite materials, tolerances in the order of 0.001 to 0.0015 inches must be kept which have not been achievable with prior molding methods and equipment. It thus has been found to be desirable to provide an improved method and apparatus for molding articles of composite materials in which close tolerances can be held, in a simple, effective and economical manner.

Prior art methods such as disclosed in Windecker U.S. Pat. No. 3,427,689 and Beaver U.S. Pat. No. 3,896,206 cannot produce a seamless product due to the two-part mold used. A net shape molded tubular product is therefore also impossible to produce because of these seams.

None of the prior art methods however is capable of producing a seamless, net shape, tapered tubular of a broad and substantially infinite variety of tapered tubular shapes and lengths. For instance, the prior art methods are not capable of producing a seamless tapered tubular of greater than 1.5 inches in diameter and at least 5 feet long. Seamless tapered tubulars may be required to be as long as 90 feet with a diameter as great as 4 feet but such tubulars would be impossible under prior art restrictions.

Accordingly, it is one of the principal objects of the present invention to provide an improved molded article formed of a composite material.

A further object of the present invention is to provide an improved molded article that is seamless and has a net shape with precise dimensions when removed from its mold.

Another object of the present invention is to provide an improved molded article formed of a composite material in which dimensional tolerances in the order of 0.001 to 0.0015 inches are maintained.

A further object of the present invention is to provide an improved elongated, tapered and hollow molded tube formed of a composite material and having very narrow diameters as small as 0.1 inch or as great as 4 feet and lengths from 3 feet to 90 feet with a taper diameter 0.002" per inch to an infinite taper.

Another object of the present invention is to provide an improved method of molding a seamless, tapered tube of net shape upon removal from the mold and formed of a composite material in which precise tolerances of the article are maintained.

A still further object of the present invention is to provide an improved method of molding an elongated, tapered, seamless and hollow tube of net shape formed of a composite material in which close tolerances can be maintained, which is simple, effective and economical.

A further object of the present invention is to provide an improved apparatus for molding an elongated, tapered, seamless and hollow tube of net shape from a composite material.

Another object of the present invention is to provide an improved apparatus for molding an elongated, tapered, seamless tube of net shape formed of a composite material in which close dimensional tolerances of the article scan be maintained.

A further object of the present invention is to provide an improved apparatus for molding an elongated, tapered, seamless tube of net shape formed of a composite material which is simple in design, relatively inexpensive to construct and highly effective in performance.

Other objects and advantages of the present invention will become more apparent to those persons having ordinary skill in the art to which the present invention pertains from the following description taken in conjunction with the accompanying drawings wherein.

Figure 1:
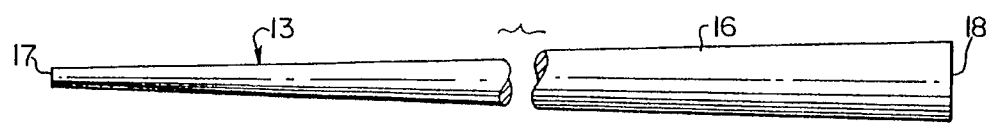
FIG. 1 is a side elevational view of a mandrel utilized in an embodiment of the present invention, having a portion thereof broken away.
Figure 2:
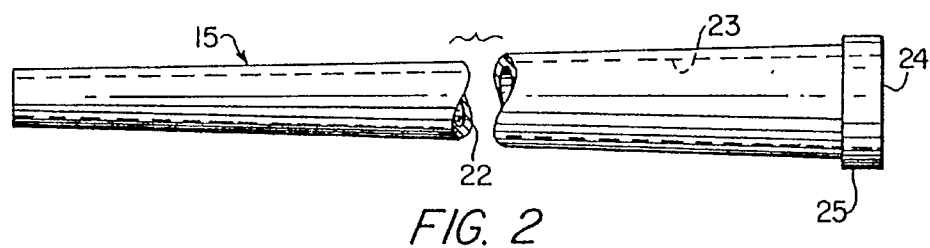
FIG. 2 is a side elevational view of a shell member utilized with the mandrel shown in FIG. 1 in such embodiment, having a portion thereof broken away.
Figure 3:
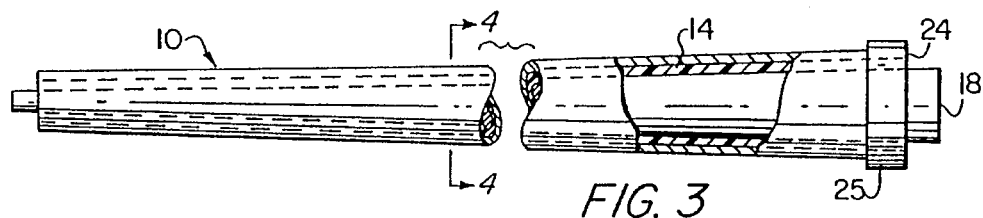
FIG. 3 is a side elevational view of the mandrel and shell member shown in FIGS. 1 and 2, illustrated in an assembled condition, having a portion thereof broken away.
Figure 4:
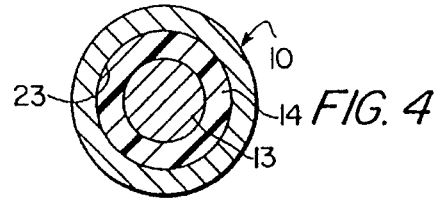
FIG. 4 is an enlarged cross-sectional view taken along line 4—4 in FIG. 3.
Figure 6:
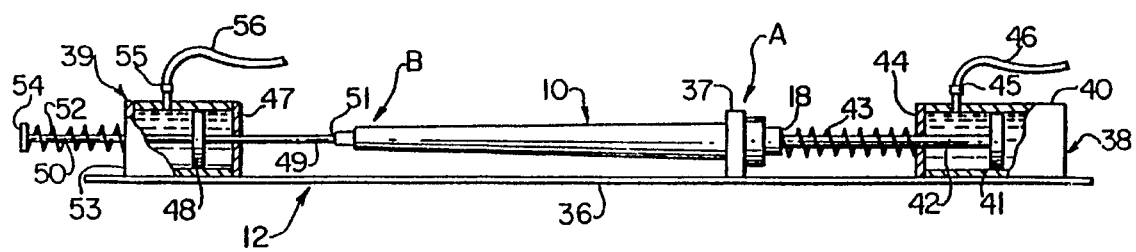
FIG. 6 is a side elevational view of the apparatus for molding a seamless, tapered composite tube of net shape using both compressive and tensile forces for the molding.

Referring to FIGS. 3 and 6 of the drawings, there is shown a mold assembly 10 which may be mounted on fixture 11 or 12 to mold an article consisting of a composite material in accordance with the present invention. The mold assembly includes a mandrel 13 as shown in FIG. 1 and a shell 15 as shown in FIG. 2. A composite material 14 is applied onto the mandrel 13 and the mandrel so coated is then inserted into the shell 15. The mandrel consists of an elongated, solid material having a tapered surface 16 and end surfaces 17 and 18. It may be formed of a metallic material such as aluminum, bronze and certain steels including stainless steel, which may be machined to the desired configuration, which have sufficient strength and rigidity and which have good heat conducting properties. In applications where the dimensions of the inside diameter of the molded article are important, the mandrel may be formed of a material having a coefficient of thermal expansion substantially the same as the material of which the molded article is to be formed. However, the matching of such coefficients of thermal expansion is not essential or critical.

Most suitably, the mandrel may be formed of a composite material in such applications and may be a composite material which is the same as the composite material of which the molded article is to be formed.

The composite material applied to tapered surface 16 of the mandrel generally consists of a matrix of reinforced fibers impregnated with a resin. The reinforcing fibers may consist of any suitable materials normally used to impart strength to molded articles formed of composite materials. Examples of such materials are graphite carbon, boron, glass, aramid (sold under the trademark KELVAR) and the like.

The reinforcing fibers forming the matrix of the composite material may be either preimpregnated with the resin prior to being applied to the mandrel or may be impregnated with the resin after the dry fibers have been applied to the mandrel.

The resin may consist of any suitable thermosetting or thermoplastic resin. The thermosetting resin preferably polymerizes and cross-links upon being heated to a predetermined temperature, usually in the range of 250° F. and 400° F. Examples of such resins are phenolic resins, alkyds, amino resins, polyesters, epoxies, polyurethanes, phenolfurfural resins, cellulose acetates, and cellulose nitrates, bismyliamide and the like.

Among the thermoplastics that are useful in the present invention are polyolefins, such as polyethylene, polypropylene, etc., polyfluorocarbons, vinyl polymers, polystyrene, acrylics, nylon, polycarbonates, silicones and various cellulose ethers and esters.

Figure 7:
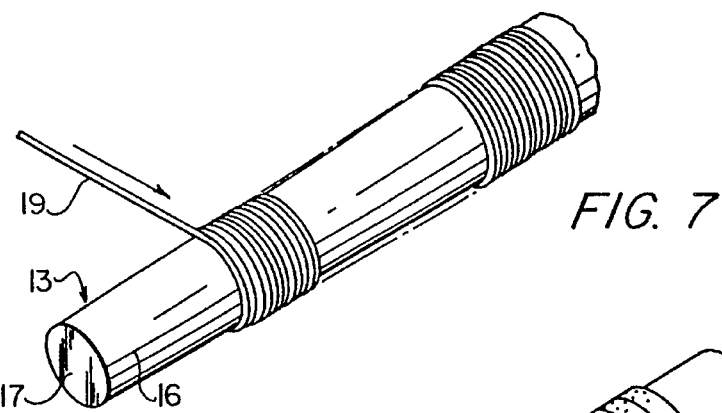
FIG. 7 is a perspective view of a portion of the mandrel shown in FIG. 1, illustrating the manner in which a layer of reinforcing fiber is applied thereon.
Figure 8:
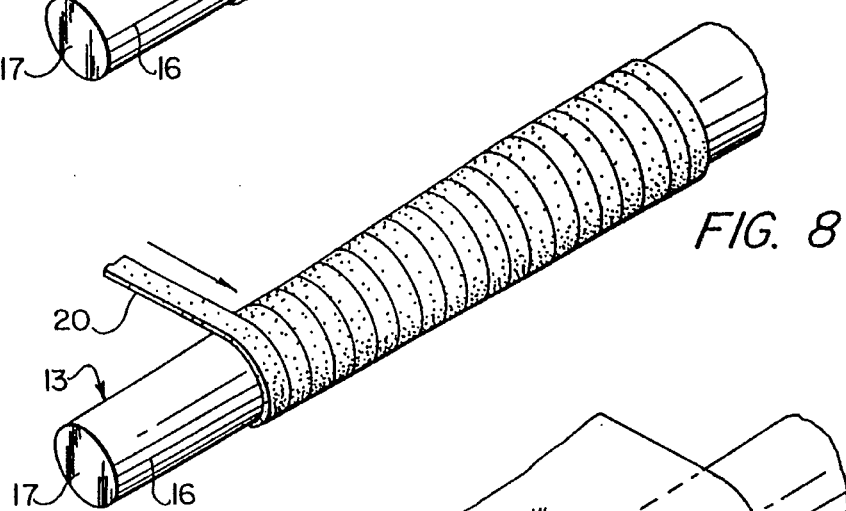
FIG. 8 is a view similar to the view shown in FIG. 7, illustrating the manner in which a layer of tape of composite material is applied to the mandrel.
Figure 9:
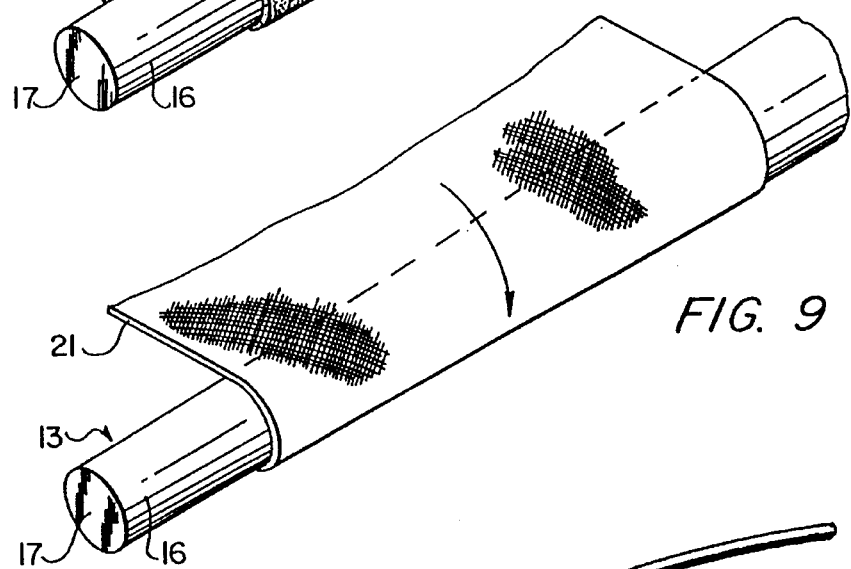
FIG. 9 is a view similar to the view shown in FIG. 7, illustrating the manner of applying a layer of sheet of composite material on the mandrel.

As best shown in FIGS. 7 through 9, the composite material may be in the form of a strand of filament 19, a strand of tape 20 or a sheet 21. Element 19 consists of a reinforcing fiber that may be preimpregnated with a resin or have the resin applied in dry form on the mandrel and then impregnated with a suitable resin. The filament is applied on the mandrel by winding it on tapered surface 16 in the manner as shown in FIG. 7. Multiple layers of the filament may be applied depending on the desired thickness of the article being molded. In addition, the filaments of the different layers wound on the mandrel may be unidirectional or multidirectional to impart desired strength characteristics to the molded article. The composite material consisting of the tape 20 generally consists of a plurality of longitudinally disposed reinforcing fibers embedded in a thermosetting resin. The material is applied to the mandrel by winding it on surface 16. Multiple layers of the tape may be applied to provide the desired thickness of the molded article. The layers of tape applied may be applied in a manner whereby the reinforcing fibers are unidirectional or multidirectional, again depending on the strength characteristics sought to be imparted in the molded article. The composite material in the form of a sheet 21 consists of a matrix of woven reinforcing fibers embedded in the material. Again, multiple layers of such sheets may be applied to tapered surface 16 of the mandrel to provide the desired thickness of the article being molded.

Shell member 15 consists of an elongated member formed of a composite material and may be the same composite material used in forming the molded article. It is provided with a longitudinal bore 22 providing a tapered surface 23 having a configuration of the desired configuration of the outer surface of the article being molded. The shell member has a length slightly shorter than the length of mandrel 13 so that when the mandrel with composite material applied thereon is inserted in the shell member, and the composite material engages and is compressed against tapered surface 23 of the shell member, the end portions of the mandrel will project beyond the ends of the shell member. For the purpose of mounting the mold assembly shown in FIG. 3 in either of the fixtures shown in FIGS. 5 and 6, the shell member is formed with a collar portion 24 at the end of greater diameter to provide an annular abutment shoulder 25.

In molding the composite material applied to a mandrel with the mandrel inserted in the shell member, the assembly as shown in FIG. 3 is mounted on a fixture as shown in FIG. 6 and then heated to the curing temperature of the resin. Preferably, any air entrapped in the layers of the composite material is removed prior to heating to form a more uniform and dense structure with precise dimensions. This can be accomplished either by mounting the mold assembly in fixture 12 and placing the entire assembly in an autoclave in which a vacuum is drawn and then heat is applied, or placing the entire assembly in an autoclave to evacuate the air and then placing the assembly in a separate heating oven to cure the resin.

It should be noted that fixture 12 provides for a dual action as shown at A and B respectively in FIG. 6. While these actions and the accompanying structure will be described in detail hereinafter, the differences between the dual action of applying a compressire force at A and a tensile force at B at the same time in the apparatus of FIG. 6 must be emphasized when the solitary single action compressire force at A of the prior art apparatus of FIG. 5 such differences are important to achieving the benefits of the present invention. Thus understanding the details of the prior art apparatus of FIG. 5 is necessary to a fuller understanding of this invention because the apparatus for creating the compressive force A is the same as that of FIG. 6 for forming the compressive force component A of the dual forces A and B forming the present invention.

Figure 5:
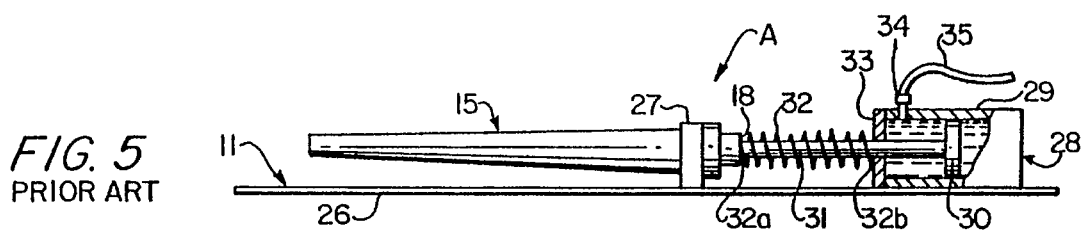
FIG. 5 is a side elevational view of an apparatus for molding a composite material, utilizing the assembly shown in FIG. 3, which embodies the prior art approach of a single force being applied.

As shown in FIG. 5, molding fixture 11 includes a support member 26, a mounting bracket 27 rigidly mounted on the support member intermediate the ends thereof, and an air cylinder assembly 28 rigidly mounted on one end of the support member. The mounting bracket is provided with an opening therethrough having a diameter slightly less than the diameter of collar portion 24 of shell member 15 so that the mold assembly shown in FIG. 3 may be inserted through mounting collar 27 with annular surface 25 of the shell member engaging mounting bracket 27. The air cylinder assembly includes a cylinder 29 rigidly secured on support member 26 and a piston 30 having a rod 31 disposed coaxially with the opening in mounting bracket 27 and the mold assembly when inserted in the mounting bracket for abutting contact with end 18 of mandrel 13. The rod 31 of the piston is provided with a surrounding coil spring 32 secured at end 32a to the rod and abutting at the other end 32b an end wall 33 of cylinder 29 to resiliently urge the piston to an extended position out of cylinder 29 and into engagement with end surface 18 of mandrel 13, when the mold assembly is inserted in the mounting bracket as shown in FIG. 5. Cylinder 29 is provided with a fixture 34 at the rod end thereof which is connected by means of a line 35 to a source of air under pressure. It will be appreciated that when air under pressure is supplied to the rod side of cylinder 29, the piston will be retracted against the biasing action of spring 32 to allow the mold assembly to be inserted into and removed from mounting bracket 27.

In the prior art use of the components as shown in FIGS. 1 and 2 and the fixture as shown in FIG. 5 to attempt to form a molded article having an elongated, tapered and hollow configuration, the selected composite material in filament, tape or sheet form is first applied to the mandrel by winding a desired number of layers of the material thereon. The mandrel with the composite material applied thereon is then inserted in the shell member to form a mold assembly as shown in FIG. 3. Air under pressure is then applied to the rod side of cylinder 29 of apparatus 11 to retract rod 31 against the biasing action of spring 32. The mold assembly then is inserted in mounting bracket 27 so that annular abutment surface 25 engages mounting bracket 27. The air in the rod end of cylinder 29 is then slowly released to cause piston 30 to extend and engage end surface 18 of the mandrel. With the air pressure in the rod side of the cylinder having been removed, spring 32 functions to exert merely a single axially directed, compressire force on mandrel 13, displacing it relative to shell 15 and compressing the layers of composite material applied on tapered surface 16 of the mandrel against internally tapered surface 23 of the shell member.

With the mold assembly mounted in fixture 11 as shown in FIG. 5, the entire assembly is then placed in an autoclave. A vacuum is drawn in the autoclave to remove any air entrapped in the composite material. After such air pockets are eliminated, the mold assembly is heated to the curing temperature of the resin in the composite material while continuing to apply the single axially directed compressive force by means of spring 32 to polymerize the resin and forman article having an outer surface that is supposed to conform to the configuration of internally tapered surface 23 of the shell member. After the resin has polymerized and the entire assembly has cooled, the assembly may be removed from the autoclave, air under pressure may be supplied to the rod end of cylinder 29 to retract the piston and mold assembly 10 may be removed from the fixture. The protruding small end of the mandrel then may be tapped to dislodge it from the molded article and the shell also may be removed to provide the finished product. To facilitate the removal of the mandrel, conventional mold release agents can be applied to tapered surface 16 of the mandrel.

In the use of the method as described, articles molded of a composite material can be formed with lengths only up to about 5 feet in length with a maximum diameter of about 1.5 inches. The wall thickness is in the order of 0.100 to 0.500 inches. The thickness of the walls will be dependent on the dimensions of the mandrel and the internal tapered surface of the shell member, and the number of strands of filament or tape, or sheets of material applied to the mandrel. Such materials have thicknesses in the order of 0.003 to 0.015 inches which allows molded articles of various thicknesses to be formed in accordance with the present invention. Generally, results with limited usefulness have been achieved in with a shell member formed of a composite material having a wall thickness of 0.200 inches. Furthermore, good results have been obtained in utilizing a spring force providing a pressure of 80 p.s.i.

The product produced from such apparatus as in FIG. 5 using only a single compressive force A has serious limitations because any attempts to produce a tapered, seamless, tubular having greater than a 5 foot length with greater than a 1.5 inch diameter leads invariably to a warped surface that is not dimensionally accurate.

Tapered, seamless tubulars are often necessary to have a length greater than 5 feet and a diameter greater than 1.5 inches but such cannot be produced with precision dimensions or with a net shape because of warpage occurring at such great lengths and wide diameters. It is important that there be a reliable means and method to produce precision tapered composite tubulars of such length. Only with the apparatus of FIG. 6 is this possible.

Dual acting forces at A and B provide the necessary molding pressure in the practice of the method of the present invention as described in the use of a fixture as shown in FIG. 6. The compressive force at A similar to that produced by the apparatus of FIG. 5 must be simultaneously combined with the tensile force B to accomplish the goal of the present invention.

Such fixture generally includes a support member 36, a mounting bracket 37 mounted on the support member intermediate its ends, and a pair of air cylinder assemblies 38 and 39 mounted on opposite ends of the support member. Mounting bracket 37 is similar to mounting bracket 27 of fixture 11 and includes an opening therethrough in which a mold assembly 10 may be inserted. Air cylinder assembly 38 is similar to air cylinder assembly 28 of fixture 11 and includes a cylinder 40 rigidly mounted on the support member and a piston 41 having a rod 42 disposed coaxially relative to the opening in mounting bracket 37 and a mandrel of assembly 10 mounted in bracket 37. The free end portion of the rod is adapted to engage end surface 18 of the mandrel of assembly 10 by means of a coil spring 43 acting in concertwith the free end of rod 42 and an end wall 44 of cylinder 40 similarly as described previously with respect to FIG. 5. Cylinder 40 is provided with a fixture 45 communicating with a source of air under pressure by means of a supply line 46 so that air under pressure may be supplied to the rod end of cylinder 40 to retract piston 41 against the biasing action of coil spring 43. This structure will produce the compressive force A that is only a part of the dual action forces A and B that are necessary to be applied to avoid warping.

Air cylinder assembly 39 consists of a cylinder 47 rigidly mounted on support member 36 and a piston 48 having a rearwardly projecting rod portion 49 and a forwardly projecting rod 50. As shown in FIG. 6, rod portions 49 and 50 are disposed coaxially relative to rod 42 and mold assembly 10 mounted in mounting bracket 37. The free end of rod portion 49 is provided with suitable means including threaded, gripping or clamping means (not shown) for connecting rod portion 49 to an exposed end 51 of the mandrel of mold assembly 10. Rod 50 is provided with a coil spring 52 interposed between an end wall 53 of cylinder 47 and a collar 54 formed on the free end of the rod 50, which operates to bias piston 48 away from mounting bracket 37. Cylinder 47 also is provided with a fixture 55 provided with a line 56 connected to a source of air under pressure for supplying pressurized air to the front end of cylinder 47.

In the operation of the present invention as shown in FIG. 6, air under pressure is supplied to the rod end of cylinder 40 to retract the piston thereof, and air under pressure is supplied to the front end of cylinder 47 to displace rod portion 49 rearwardly. Mold assembly 10 is then inserted through the opening in mounting bracket 37 and connected to the end of rod portion 49. The air is then released from both cylinder assemblies so that rod 42 extends and engages end surface 18 of the mandrel of assembly 10 to provide the compressive force A, one of the components of the dual force action required. Compressive force A acts on the mandrel by virtue of the biasing action of spring 43.

The essential other component of the dual action is the tensile force B applied to the mandrel at its end 51 through the biasing action of coil spring 52 acting upon both collar 54 at one end and wall 53 of the cylinder 47 at the other. The spring 52 is designed to provide a force sufficient to produce a pressure up to 80 p.s.i. With the combined compressive force A and tensile force B acting simultaneously on mandrel 13 the resulting product can be greater than 5 feet long and 1.5 inches in diameter without warping.

In the fixture shown in FIG. 6, the mandrel and shell member are displaced axially toward each other under compressive force A and tensile force B to compress the layers of composite material between tapered surface 16 of the mandrel and internally tapered surface 23 of the shell member to form the elongated, seamless, tapered molded tubular of net shape without any sign of warping.

Figure 10:
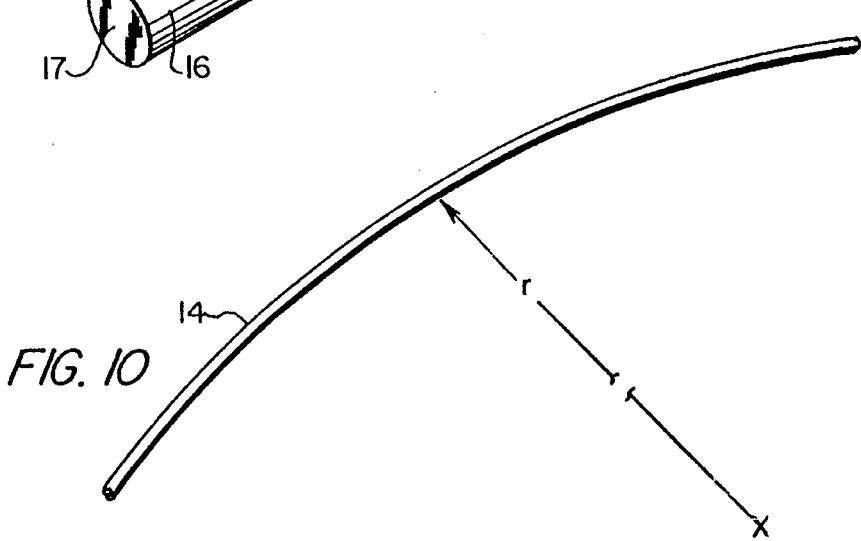
FIG. 10 is a perspective view of an elongated, tapered and hollow article formed by a method of the present invention, utilizing the apparatus shown in FIG. 6.

It is contemplated that a substantially elongated, tapered and hollow seamless article having an extremely small wall thickness and a substantial radius of curvature, as shown in FIG. 10, can be produced in accordance Withthe present method while maintaining dimensional tolerances in the magnitude of 0.0010 to 0.0015 inches. In practice, the use of a shell member formed of the same composite material of which the molded article is to be formed, optionally produces favorable results. Further dimensional accuracy may optionally be obtained by utilizing a mandrel formed of a material having the same coefficient of thermal expansion as the material from which the molded article is formed.

With use of the present invention, diameters from 0.1 inches to 4 feet are capable in lengths of 3 feet to 90 feet or greater. Such long tapered seamless tubulars were not possible heretofore. Tapers from 0.002 inches per linear inch up to infinite taper are easily attainable.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A seamless, elongated, tapered, tubular member of net shape having a length of 3 to 90 feet and a diameter of 0.1 inches to 4 feet, said tubular member formed by a method comprising the steps of:

providing an elongated, tapered mandrel;

applying a composite material consisting of a matrix of reinforcing fibers combined with a resin material onto said mandrel;

providing a one piece shell having an elongated, tapered bore;

inserting said mandrel with said composite material applied thereon into said bore of said shell to provide a mold assembly;

heating said mold assembly;

applying a tensile force at one end of said mandrel while simultaneously applying a compressive force at the other end of said mandrel;

displacing said mandrel and shell longitudinally toward each other under said tensile force and said compressive force to compress said composite material;

allowing said mold assembly to cool while continuing to apply said tensile and compressive forces on said composite material;

separating said shell and mandrel and removing said tubular member from said mandrel.

2. An article according to claim 1 wherein the method further comprises the step of removing gases entrapped in said composite material prior to heating said mold assembly.

3. An article according to claim 1 wherein said shell comprises reinforcing fibers impregnated with a resin.

4. An article according to claim 3 wherein said shell is formed of a material similar to the composite material being molded.

5. An article according to claim 3 wherein said composite material includes at least two layers of reinforcing fibers.

6. An article according to claim 3 wherein said fibers are selected from the group consisting of graphite, boron, glass and aramid.

7. An article according to claim 5 wherein said fibers are oriented unidirectionally.

8. An article according to claim 5 wherein said fibers are oriented multidirectionally.

9. An article according to claim 3 wherein said resin is selected from the group consisting of phenolic resins, alkyds, amino resins, polyesters, epoxies, polyurethanes, phenolfurfural resins, cellulose acetates, cellulose nitrates, bismaleimide resins, polyolefins, polyfluorocarbons, vinyl polymers, polystyrene, acrylics, nylon, polycarbonates, silicones cellulose ethers and cellulose esters.

10. An article according to claim 3 wherein said composite material is applied to the mandrel as a tape comprising a plurality of longitudinally disposed resin forcing fibers embedded in a resin.

11. An article according to claim 3 wherein said composite material includes at least two layers each layer comprising woven fibers impregnated with a thermosetting material.

* * * * *